(12) United States Patent
Westphal et al.

(10) Patent No.: US 7,083,125 B2
(45) Date of Patent: Aug. 1, 2006

(54) DETACHABLE TUBE ASSEMBLY

(75) Inventors: Nathan R. Westphal, Union Grove, WI (US); Steven B. Mineau, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 318 days.

(21) Appl. No.: 10/847,093

(22) Filed: May 17, 2004

(65) Prior Publication Data

US 2005/0252995 A1 Nov. 17, 2005

(51) Int. Cl.
*B05B 15/06* (2006.01)
*B05B 9/08* (2006.01)
*B05B 15/08* (2006.01)

(52) U.S. Cl. ............... 239/532; 239/525; 239/530; 239/587.1; 239/588

(58) Field of Classification Search ............ 239/532, 239/525, 530, 531, 587.1, 588; 222/158, 222/320, 386; 47/79, 48.5
See application file for complete search history.

(56) References Cited

U.S. PATENT DOCUMENTS

| | | | | |
|---|---|---|---|---|
| 3,977,570 | A | * | 8/1976 | Smrt .................... 222/174 |
| 4,457,472 | A | * | 7/1984 | Geberth, Jr. ............ 239/532 |
| 5,186,392 | A | * | 2/1993 | Pleshek ................. 239/532 |
| 6,158,152 | A | * | 12/2000 | Nathenson et al. ......... 37/347 |
| 6,540,424 | B1 | | 4/2003 | Hall et al. |
| 6,619,570 | B1 | * | 9/2003 | Ericksen et al. ......... 239/532 |
| 6,663,307 | B1 | | 12/2003 | Kopanic et al. |
| 2003/0233718 | A1 | | 12/2003 | Heathcock et al. |
| 2003/0235463 | A1 | | 12/2003 | Neumann et al. |

\* cited by examiner

*Primary Examiner*—Davis Hwu

(57) ABSTRACT

Detachable tube assemblies, such as those useful in remote spraying devices, are disclosed. Tube segments are interconnected using radial extensions interfit with alignable radial holes on tubes to be coupled together. An actuator rod is provided with flexible barbs and a disk guide. The rod can be used to remotely actuate a spray.

7 Claims, 4 Drawing Sheets

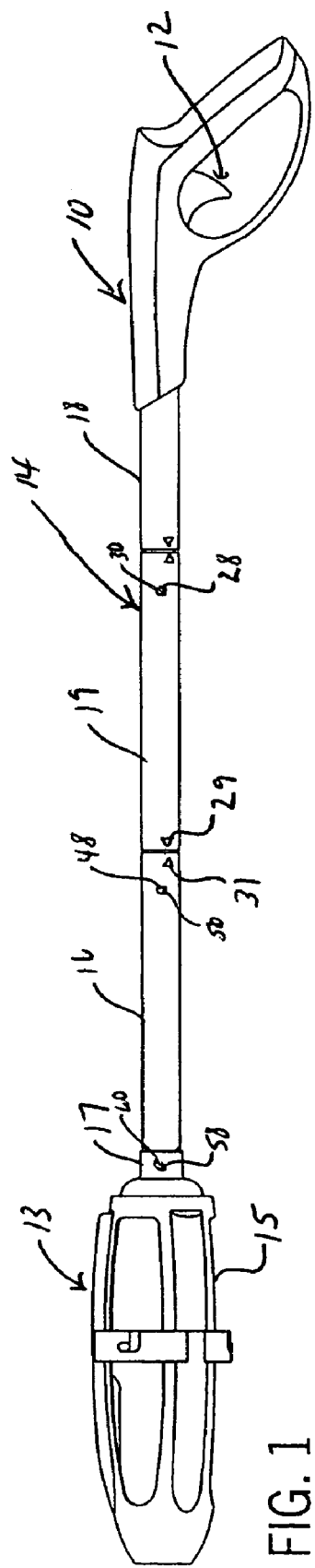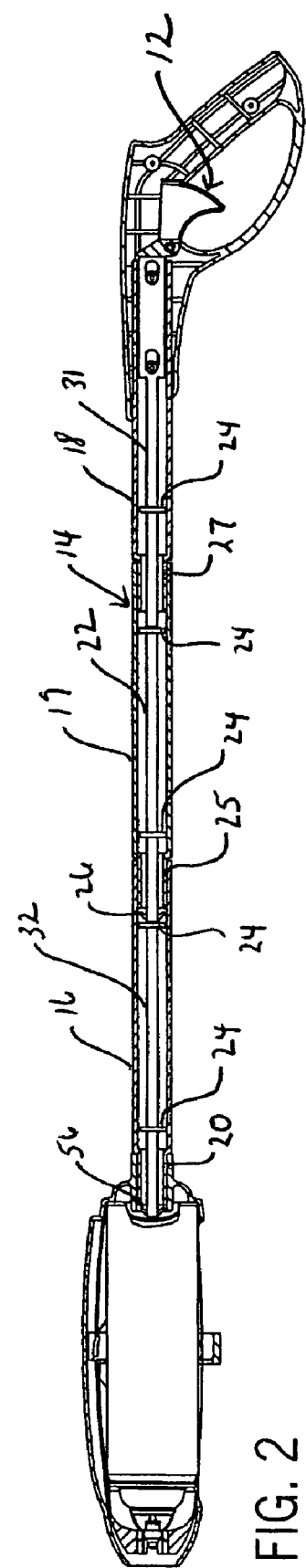

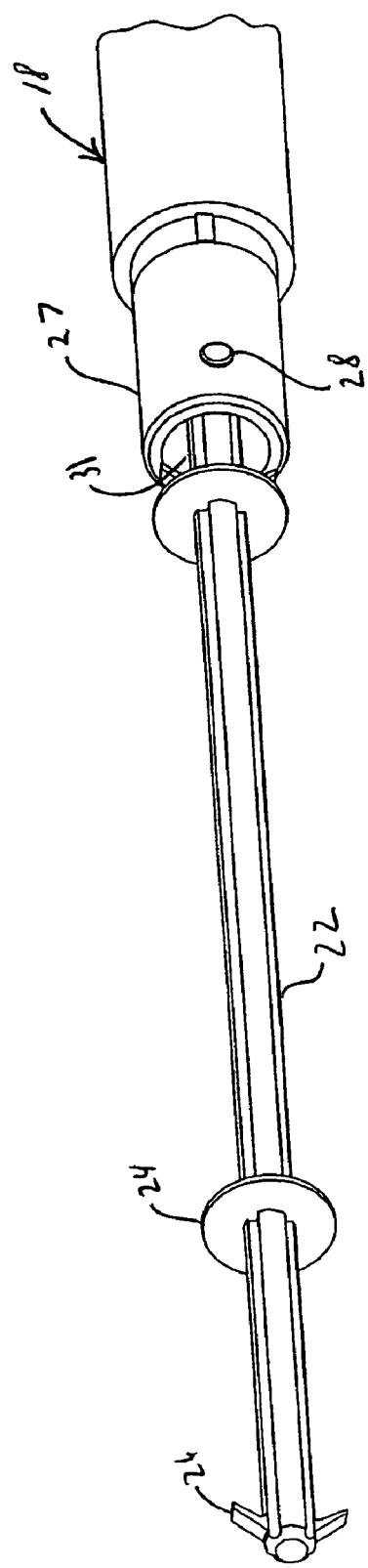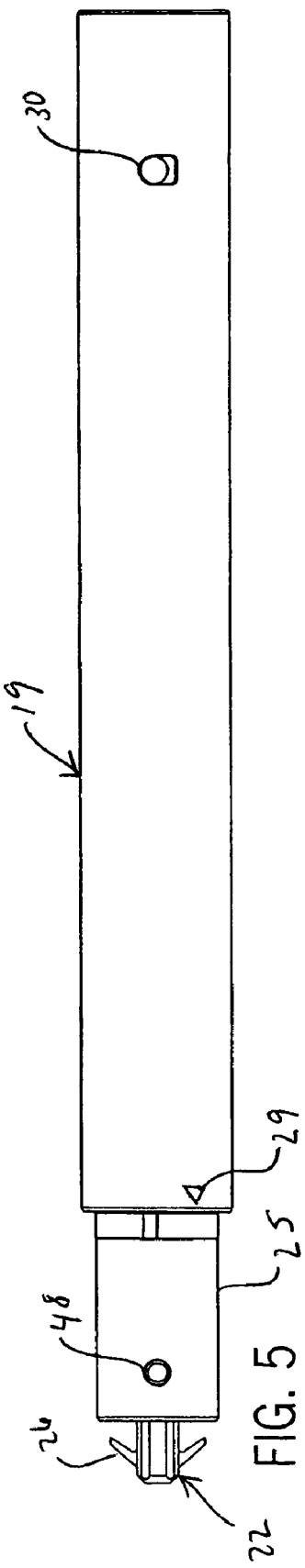
FIG. 4
FIG. 5

DETACHABLE TUBE ASSEMBLY

CROSS REFERENCE TO RELATED APPLICATIONS

Not applicable

Statement Regarding Federally Sponsored Research/Development

Not applicable

BACKGROUND OF THE INVENTION

The invention relates to a device for detachably coupling tubes together, and more particularly for detachably coupling tubes for use as part of a handle and actuator system for a remote spray assembly.

Aerosol cans and similar pressurized spray canisters are most frequently actuated by a user directly pressing a button or other structure that activates the can's valve. Typically, this means that the user must directly hold the canister in his or her hand, and the surface to be sprayed must be no further away than can be reached by the spray pattern of the canister.

This will present problems for some applications. For example, except for some specialty sprays designed to project a narrow stream a long distance (such as certain conventional wasp sprayers), most common aerosol sprays tend to fan out quite quickly. Consequently, a user cannot apply the spray to a small, localized area such as a window sill, an area under a bush or other plant, or the like, unless the can (and therefore the user's hand) can be within inches of the target area.

In any event, many users would prefer to keep their distance from certain sprays, such as pesticides, regardless of the capability of the sprayer. Even when there is no danger in the proper use of the pesticide, they desire separation simply as a matter of aesthetic preference.

Because of these and other issues, devices for spraying a remote target or area have been developed, such as those described in U.S. Pat. No. 6,663,307, the disclosure of which is hereby incorporated by reference as if fully set forth herein. This patent describes a device for spraying pesticides, agricultural treatment chemicals, and/or other chemicals, the device having a housing configured to retain a spray canister, an actuator rod on the housing, a shaft connected to the housing, and a linkage to trigger the spray canister to effectuate remote spraying.

While this device is very useful for maintaining a distance between a user and the chemical being sprayed, the tube segments which make up the shaft were designed for permanent assembly. It could be somewhat difficult to disassemble the tubes for maintenance and/or other reasons (such as more compact storage between uses).

Other systems have been developed for linking tubes together, where the tubes are designed to house segments of axially movable rods. Examples are disclosed in U.S. Pat. Nos. 6,663,307 and 6,540,424. When these assemblies are shipped and stored for sale it is preferable that their storage carton be as small as possible (e.g. retailers are reluctant to provide extra space when shelf space is as scarce as it usually is). Thus, the tubes are packaged in disassembled form. In such cases, it is the consumer that will typically have to assemble the device. Where the assembly instructions are complex, it may take the consumer extra time to assemble the device, and in some cases the consumer may become frustrated before assembly is completed.

Hence, there is a continuing need for structures of this type where the assembly technique is simpler and more intuitive.

SUMMARY OF THE INVENTION

The present invention provides a detachable tube assembly. It has a first tube having at least one of a radial aperture and a radial projection, and a second tube capable of telescoping into an end of the first tube. The second tube has at least one of a radial aperture and a radial projection along a portion of the second tube that is capable of telescoping into said end of the first tube such that a radial projection along one of the tubes can extend into a radial aperture along the other of the tubes. This can lock the two tubes together, in a releasable manner.

There is also a rod extendable along (preferably through) the second tube, the rod having a radial flexible barb adjacent a distal end of the rod. The flexible barb is sized and dimensioned to pass through the telescopable portion of the second tube while being flexed radially inwardly by the second tube, and then flex radially outwardly when the barb has passed through that telescopable portion, such that a portion (e.g. an end) of the second tube adjacent the telescopable portion thereof can limit return movement of the barb back through the second tube. There is also a guide linked to the rod to move therewith, which extends radially outwardly there from.

In a preferred form the second tube has a narrowed portion forming at least a part of its telescopable portion, the guide having a greater width than an inner diameter of the narrowed portion of the second tube. This prevents the rod from simply passing out the bottom of the second tube once the rod has been inserted in the top of the second tube.

In other preferred forms there are a plurality of such guides, and such plurality of guides may be in the form of disks that are integrally formed with the rod. When an end of the second tube is telescoped into an end of the first tube, the rod can be positioned inside both the first and second tubes so as to be axially movably received therein, albeit with a limited range of axial motion due to the barb and closest guide trapping the rod.

This invention has applicability to a wide range of devices in which tubes are telescoped together while housing an axially movable rod. However, the primary utility of this invention is in connection with remote sprayers. For example, an upper end of the rod can be linked to a triggering device that can cause the rod to move axially in the first and second tubes, and a lower end of the rod can be linked ultimately (e.g. through other connecting linkages) to a container (e.g. an aerosol container) for dispensing a chemical (e.g. an insecticide or cleaning chemical).

The present invention allows pre-assembly (e.g. at the factory) of one of the tubes and the movable rod. A consumer can then, in a highly conceptual manner, be instructed as to how to assemble that subassembly with further such subassemblies. Hence, the device is easier for a consumer to construct. Nevertheless, it is inexpensive to produce, easy to manufacture, and secure in its connection.

These and other advantages of the invention will be apparent from the following description. In this description, reference is made to the accompanying drawings which form a part hereof, and in which there is shown by way of illustration a preferred embodiment of the invention. Such embodiment and its particular advantages do not define the full scope of the invention. Thus, reference should be made to the claims for interpreting the full scope of the invention.

BRIEF DESCRIPTION OF THE DRAWINGS

FIG. 1 is a left side elevational view of a sprayer device constructed in accordance with the present invention;

FIG. 2 is a vertical section view thereof;

FIG. 4 is a lower, left, rear perspective view of a trigger portion of the present assembly;

FIG. 5 is a left side elevational view of a central portion of the present assembly;

DETAILED DESCRIPTION OF THE PREFERRED EMBODIMENTS

Figure 3:
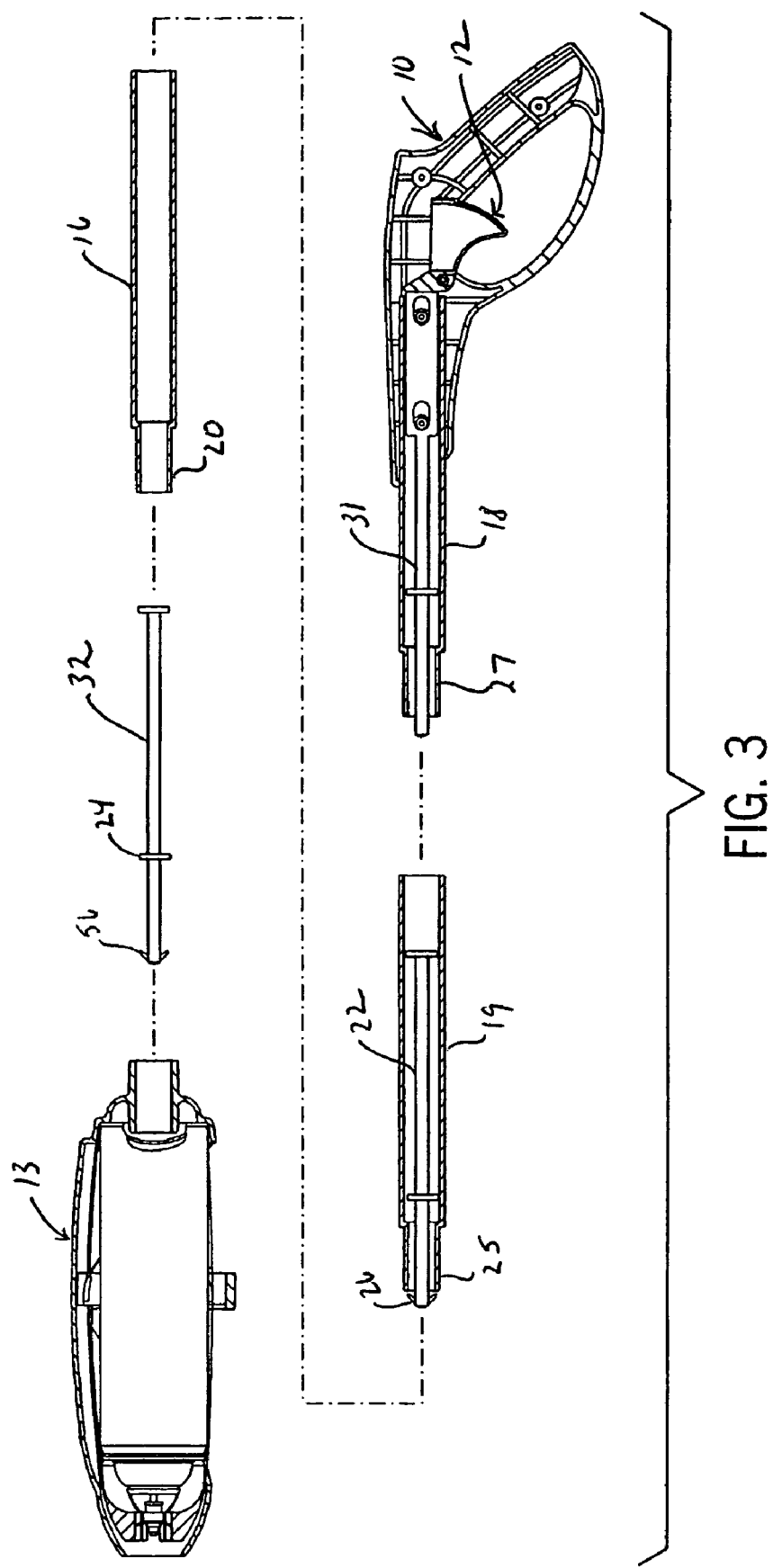
FIG. 3 is an exploded sectional view of the FIG. 2 structure.

Referring first to FIG. 1, a sprayer device is shown including a handle assembly (generally 10) for attachment to a canister assembly 13. There is a canister housing 15 for receiving an aerosol can containing a pesticide, insecticide, agricultural chemical, or other chemical to be sprayed. The housing 15 includes a connecting portion 17 which is tubular in shape, and which is detachably connectable to the handle assembly 10. As described below, the handle assembly can include a plurality of tubes 16, 18, and 19.

Referring still to FIG. 1 and now also to FIGS. 2 and 3, a trigger assembly 12 is coupled to an actuator rod formed of multiple segments such as 31, 22, and 32. Rod portion 31 is coupled to the trigger assembly 12 and at the opposing end is sized and dimensioned to contact the next rod 22. Along the length of the rod 22 are positioned one or more disks 24, each having a diameter sized and dimensioned to fit within the tubular segment 19 and to axially align the rod 22. The actuator rod 22 extends axially through tube 19 such that the radially-extending flexible barbed end 26 extends beyond the end thereof.

Figure 6:
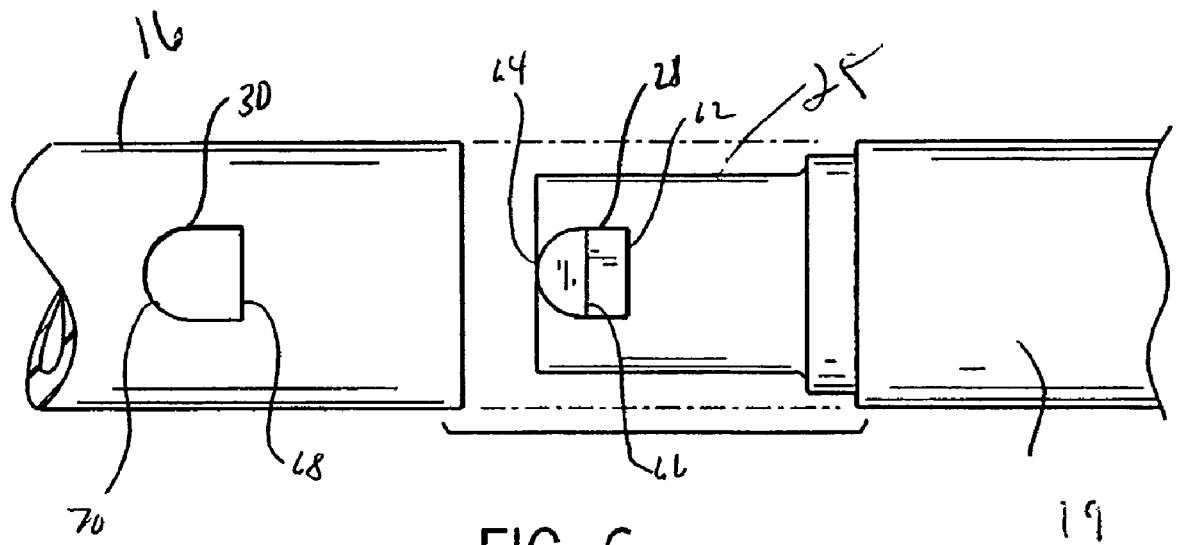
FIG. 6 is a fragmentary view of a junction between adjacent tubes, albeit with the actuator rod removed.

Tube 18 has a narrowed end 25 sized and dimensioned to fit into tube segment 16 which has a similar narrowed end 20. As shown in FIG. 6, narrowed end further includes a radial projection 28. The radial projection 28 can be constructed of a flexible material, or can alternatively be constructed using springs or other elements which allow the projection 28 to retract.

Referring now also to FIG. 5, at a first end the tube segment 19 includes an aperture 30 sized and dimensioned to receive a projection 28 to lock the central tube segment 19 onto the trigger assembly. At the opposing end, the central tube segment 19 includes a narrowed end 25 which is sized and dimensioned to fit in tube segment 16. A radial projection 48 is provided on the narrowed end 25 for receipt in the tube segment 16. In the most preferred forms the distal end of one rod segment is slightly bowed outwardly and the adjacent end of the next rod segment is dished inwardly such that the rods easily mate when in contact.

Tube segment 16 includes a narrowed end 20 which is sized and dimensioned to be received in the tubular connector 17 of the canister housing 15 to provide a continuous shaft assembly 14 between the canister housing 15 and the trigger assembly 12. The narrowed end 20 can include a projection 58 to be received in a mating aperture in the tubular connector 17 of the housing 15. Again, the projection 58 can be flexible to allow the projection 58 to be snapped into the aperture 60 to lock the adjacent tube segments together.

A third axially moveable rod segment 32 is provided in the tube segment 16, and preferably includes a depression at one end for receiving the distal end of the rod segment 22, and a radially-extending flexible barbed end 56 at the opposing end. As described with reference to the axially moveable rod 22, the rod 32 includes a plurality of disks 24 which can be formed integrally with the rod 32 or provided as separate washers. The disks 24 maintain the axially moveable rod 32 substantially centered within the tube segment 16. The rod 32 is preferably longer than the tube segment 16, such that the distal end of the rod 32 extends through the narrowed end 20 at the tube segment 16 and is positionable adjacent a spray actuator (not shown) adjacent the canister 15 to allow activation of the spray canister.

The spraying device is assembled by mounting the central tube segment 19 over the actuator rod 22 onto the narrow end 27 of the tube segment 18, and the aperture 30 aligns with the projection 28 such that the projection 28 is snap fit into the aperture 30. The narrow end 25 including projection 48 is positioned at the open end. As the central tube segment 19 is moved over the barbed end 26 of the rod 22, the flexible barbs flex inward. When the tube 19 is in position, the flexible barbs 26 flex outwardly extending radially beyond the outer diameter of the narrow end 25 of the tube segment 19 adjacent the barbs 26, and therefore limiting motion of the rod 22 back into the tube segment 19. To aid in positioning the central tube segment 19 over the rod 22, alignment marks such as an arrow 29 can be provided along the edges of the tubes 18 and 19.

Similarly, the tube segment 16 is positioned over the rod 32. As the tube segment 16 is moved over the barbs 26, the barbs flex inwardly, and then flex outwardly as they exit the tube segment 16. The outwardly flexed barbs are provided adjacent the narrow end 20, and therefore they limit movement of the rod 32 back into the tube segment 19. When the tube segment 16 is in position, the tube segment 16 is positioned onto the narrow end 25 of the central tube segment 19, such that the projection 48 is aligned with the aperture 50 to couple the central tube segment 18 to the central tube segment 19.

As assembled, the rod 32 is centrally aligned in the tube segment 16, and the rod 22 in the tube segments 18 and 19. To assemble the tube segment 16 onto the central tube segment 19, the tube segment 16 is aligned with the central tube segment 19, positioned over the narrow end 27 of the central tube segment 19, and aligned such that the projection 58 aligns with the aperture 60. The tube segment 16 can therefore be locked into position, and the rod 32 adjusted such that the distal end of the rod 22 extends into a mating depression in the rod 32. The narrow end 20 of the tube segment 16 is then received in the tubular connector 17 in the canister 15. When assembled, the rod 32 is adjacent a spray activator for activating the spray canister.

When the trigger assembly 12 is activated, the rod 22 is forced axially forward toward the canister housing 15, causing the rod 32 to contact the spray activator to cause activation of the canister. Because the rods 22 and 32 are axially aligned in the tube segments 16, 18, and 19 by the rings 24, the rod assembly can repeatably and reliably activate the spray canister. Furthermore, the spray device can be disassembled during shipment or storage, and assembled when desired.

Figure 7:
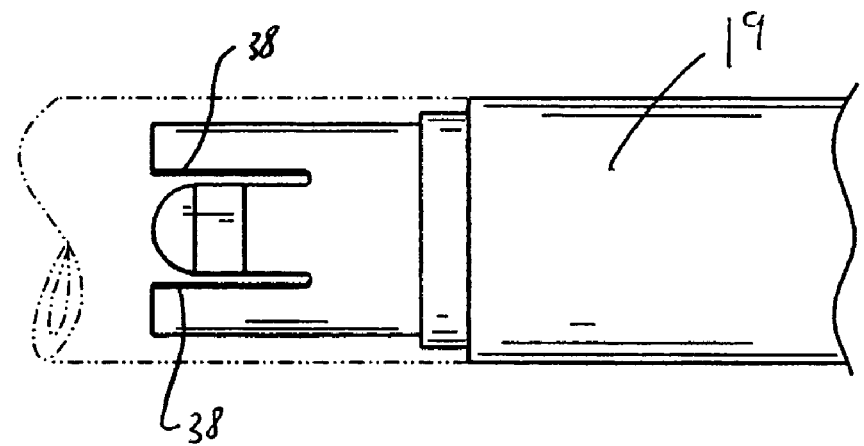
FIG. 7 is a view analogous to FIG. 6, but of an alternative embodiment, and with one tube shown only in dotted lines.

In FIG. 6 the projection 28 is alternatively shown as flat at a first end 62 and rounded at a second end 64. Extending from the flat end the projection is at a selected height up to an intermediate point 66 from which the projection tapers down toward the rounded end 14. The mating aperture 30 also includes a flat end 68 and an opposing rounded end 70 for receiving the projection 28. This makes the connection more solid. Referring now also to FIG. 7 in this embodiment the projection 28 is as described above with reference to FIG. 6, albeit axial slits 38 are provided on opposing sides of the projection.

Various alternative mechanical methods for attaching the actuator rod segments 22 and 32 (e.g. threads) will be apparent to those of skill in the art. Additionally, while the invention has been described with reference to a spraying device, various other dispensers and cleaning apparatuses which require an internal rod and a tube could also be constructed using the described coupling device. Although the assembly has been described above to include three separate tube segments 16, 18, and 19, it will be apparent that various numbers of tube segments could be connected as described, and further that a fewer number of tube segments could also be used. For example, an assembly having only two tube segment can also be used.

Hence, various modifications of the above described embodiment may be made without departing from the spirit or scope of the following claims. Thus, the claims should be looked to in order to assess the full scope of the invention.

INDUSTRIAL APPLICABILITY

Disclosed are structures for detachably coupling two tubes while simultaneously aligning and guiding an axially movable rod extending therein, such devices being suited for use with remote sprayers.

We claim:

1. A detachable tube assembly, comprising:
   a first tube having at least one of a radial aperture and a radial projection;
   a second tube capable of telescoping into an end of the first tube, the second tube also having at least one of a radial aperture and a radial projection along a portion of the second tube that is capable of telescoping into said end of the first tube such that a radial projection along one of the tubes can extend into a radial aperture along the other of the tubes;
   a rod extendable along the second tube, the rod having a radial flexible barb adjacent a distal end of the rod, the flexible barb being sized and dimensioned to pass through the telescopable portion of the second tube while being flexed radially inwardly by the second tube, and then flex radially outwardly when the barb has passed through that telescopable portion, such that a portion of the second tube adjacent the telescopable portion thereof can limit return movement of the barb back through the second tube; and
   a guide linked to the rod to move therewith which extends radially outwardly there from.

2. The detachable tube assembly of claim 1, wherein the second tube has a narrowed portion forming at least a part of its telescopable portion, the guide having a greater width than an inner diameter of the narrowed portion of the second tube.

3. The detachable tube assembly of claim 1, wherein there are a plurality of such guides, and said plurality of guides are in the form of disks that are integrally formed with the rod.

4. The detachable tube assembly of claim 1, wherein when an end of the second tube is telescoped into an end of the first tube, and the rod is positioned inside both the first and second tubes so as to be axially movably received therein albeit with a limited range of axial motion.

5. The detachable tube assembly of claim 1, wherein a narrowed end of the second tube includes a radial projection and an upper end of the first tube includes an aperture in the form of a circular through hole.

6. The detachable tube assembly of claim 1, wherein an upper end of the rod is linked to a triggering device that can cause the rod to move axially in the first and second tubes, and a lower end of the rod is linkable to a container for dispensing a chemical.

7. The detachable tube assembly of claim 1, further comprising a third tube which has a telescoping connection with the first tube.

* * * * *